US 008605166B2

(12) United States Patent
Maeda

(10) Patent No.: US 8,605,166 B2
(45) Date of Patent: Dec. 10, 2013

(54) PHOTOGRAPHING APPARATUS, PHOTOGRAPHING METHOD AND RECORDING MEDIUM

(75) Inventor: Tsumugi Maeda, Yokohama (JP)

(73) Assignee: Samsung Electronics Co., Ltd., Suwon-si (KR)

( * ) Notice: Subject to any disclaimer, the term of this patent is extended or adjusted under 35 U.S.C. 154(b) by 469 days.

(21) Appl. No.: 12/977,360

(22) Filed: Dec. 23, 2010

(65) Prior Publication Data

US 2011/0157405 A1  Jun. 30, 2011

(30) Foreign Application Priority Data

Dec. 25, 2009  (JP) .................................. 2009-295937
Dec. 14, 2010  (KR) ......................... 10-2010-0127874

(51) Int. Cl.
*H04N 5/235* (2006.01)
*H04N 5/238* (2006.01)
*H04N 5/225* (2006.01)

(52) U.S. Cl.
USPC ................. 348/222.1; 348/221.1; 348/207.99

(58) Field of Classification Search
USPC ........................................... 348/222.1, 221.1
See application file for complete search history.

(56) References Cited

U.S. PATENT DOCUMENTS

| | | | |
|---|---|---|---|
| 2006/0098882 A1* | 5/2006 | Kortum et al. ................. | 382/239 |
| 2007/0189625 A1* | 8/2007 | Battiato et al. ................. | 382/250 |
| 2009/0185748 A1* | 7/2009 | Kortum et al. ................. | 382/232 |
| 2009/0231446 A1* | 9/2009 | Lin ............................. | 348/208.4 |
| 2009/0322899 A1* | 12/2009 | Chan et al. ................. | 348/222.1 |
| 2011/0128414 A1* | 6/2011 | Walker et al. ............. | 348/231.99 |
| 2012/0120304 A1* | 5/2012 | Corcoran et al. ............. | 348/349 |

FOREIGN PATENT DOCUMENTS

| | | |
|---|---|---|
| JP | 2002-330388 A | 11/2002 |
| JP | 2004-264945 A | 9/2004 |
| JP | 2006-295316 A | 10/2006 |
| JP | 2007-060153 A | 3/2007 |
| JP | 2007-189426 A | 7/2007 |
| JP | 2008-085882 A | 4/2008 |
| JP | 2009-135698 A | 6/2009 |

OTHER PUBLICATIONS

Notice of Allowance issued for JP 2009-295937 (Oct. 15, 2013).

* cited by examiner

*Primary Examiner* — Sinh Tran
*Assistant Examiner* — Selam Gebriel
(74) *Attorney, Agent, or Firm* — Drinker Biddle & Reath LLP

(57) ABSTRACT

The photographing apparatus includes an image pickup unit that generates a raw image; a feature extractor that extracts a feature image containing at least one feature part from the raw image; an image processor that performs image processing of the raw image according to a first scene information and that performs image processing of the feature image according to a second scene information; a quantizer that performs discrete cosine transform and quantization of a raw-processed image obtained by performing image processing of the raw image and a feature-processed image obtained by performing image processing of the feature image; a difference data generator that generates difference data indicating a difference between image data obtained by processing the raw-processed image in the quantizer and feature image data obtained by processing the feature-processed image in the quantizer on a feature image data basis; and an image compressor.

12 Claims, 4 Drawing Sheets

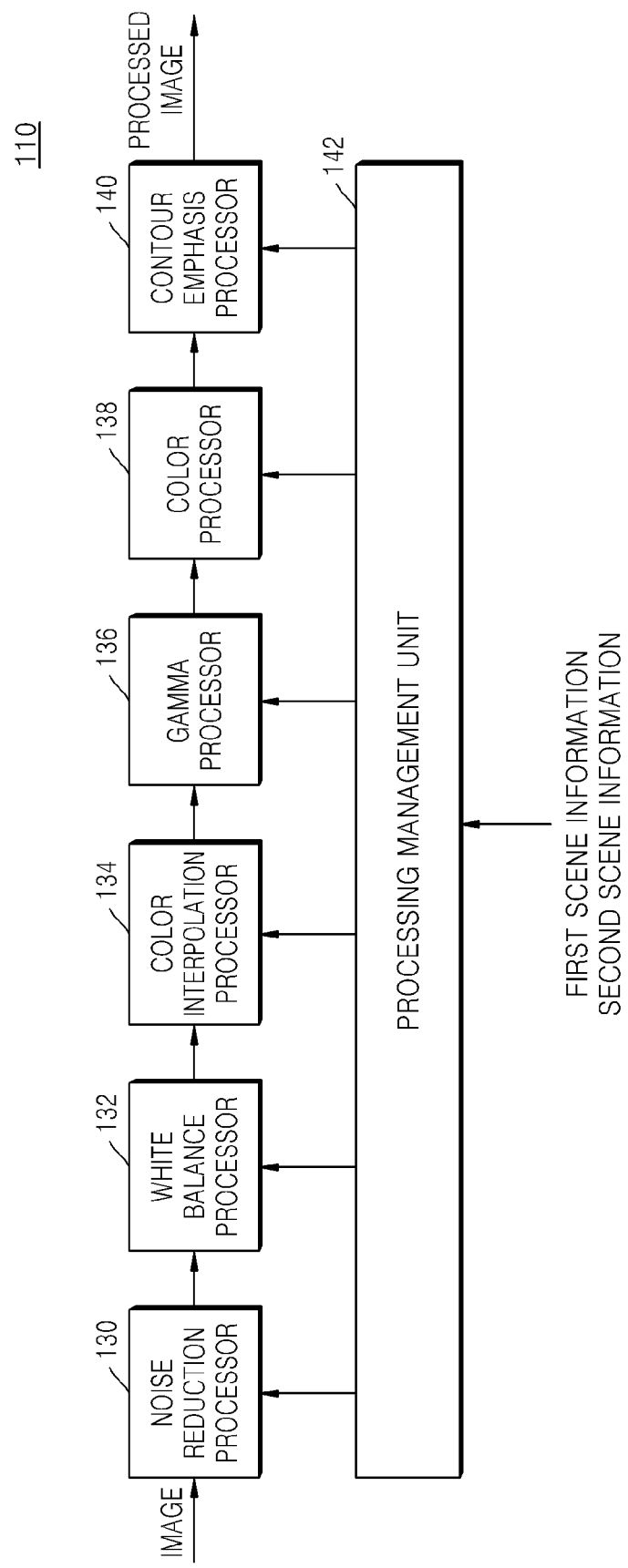

PHOTOGRAPHING APPARATUS, PHOTOGRAPHING METHOD AND RECORDING MEDIUM

CROSS-REFERENCES TO RELATED PATENT APPLICATIONS

This application claims the priority benefit of Japanese Patent Application No. 2009-295937, filed on Dec. 25, 2009, in the Japanese Patent Office and Korean Patent Application No. 10-2010-0127874, filed on Dec. 14, 2010, in the Korean Intellectual Property Office, the entire disclosures of both of which are incorporated herein by reference.

BACKGROUND

1. Field of the Invention

Embodiments relate to a photographing apparatus, a photographing method and a recording medium.

2. Description of the Related Art

Recently, a photographing apparatus, such as a digital still camera, can generate image data according to a scene mode. The scene mode may be set by memorizing several scene modes for defining processing of a raw image obtained through photographing and performing image processing according to a scene mode set by a user or set in advance when photographing is performed.

Technology for generating image data according to several scene modes includes technology for generating image data according to a scene mode corresponding to difference data by recording image data according to one scene mode and difference data corresponding to a difference between the image data and image data according to another scene mode and using the image data according to one scene mode and the difference data and technology for generating image data according to a scene mode by recording raw image data and performing image processing by parameters according to the scene mode for the raw image data.

SUMMARY

Embodiments include a photographing apparatus, a photographing method and a recording medium, whereby image data according to several scene modes can be generated that can reduce a data size and a processing time.

According to an embodiment, a photographing apparatus includes an image pickup unit that generates a raw image by capturing a subject; a feature extractor that extracts a feature image containing at least one feature part from the raw image; an image processor that performs image processing of the raw image according to a first scene information, which defines processing for the raw image, and that performs image processing of the feature image according to a second scene information, which defines processing for the feature image; a quantizer that performs discrete cosine transform (DCT) and quantization of a raw-processed image obtained by performing image processing of the raw image and a feature-processed image obtained by performing image processing of the feature image; a difference data generator that generates difference data indicating a difference between image data obtained by processing the raw-processed image in the quantizer and feature image data obtained by processing the feature-processed image in the quantizer on a feature image data basis; and an image compressor that compresses the image data.

The photographing apparatus may further include an image restorer that generates another image data obtained by performing image processing of the raw image according to the second scene information corresponding to the feature image data used to generate the difference data by adding the difference data to a compressed image data obtained by compressing the image data.

The image compressor may perform irreversible compression of the image data.

The image processor may include a multitude of processors, each of the processors selectively performing a different kind of processing for an input image; and a processing management unit that allows a first processor of the processors to perform processing according to the first scene information when the input image is the raw image and that allows a second processor of the processors to perform processing according to the second scene information when the input image is the feature image.

The photographing apparatus may further include a setup unit that sets up at least one of the first scene information and the second scene information based on a user's operation.

Another embodiment includes a photographing method comprising: generating a raw image by capturing a subject; extracting a feature image containing at least one feature part from the raw image; performing image processing of the raw image according to a first scene information, which defines processing for the raw image, based on the first scene information and performing image processing of the feature image according to a second scene information, which defines processing for the feature image, based on the second scene information; performing discrete cosine transform (DCT) and quantization of a raw-processed image obtained by performing image processing of the raw image and a feature-processed image obtained by performing image processing of the feature image; generating difference data indicating a difference between image data obtained by processing the raw-processed image in the performing of the DCT and quantization and feature image data obtained by processing the feature-processed image in the performing of the DCT and quantization on a feature image data basis; and compressing the image data.

The extracting of the feature image may include extracting feature images.

The photographing method may further include: adding the difference data to compressed image data obtained by compressing the image data; and generating image data obtained by performing image processing of the raw image according to the second scene information corresponding to the feature image data used to generate the difference data.

The compressing may include performing irreversible compression of the image data.

The photographing method may further include setting at least one of the first scene information and the second scene information based on a user's operation.

Another embodiment includes a recording medium having recorded thereon a computer readable program for executing the photographing method.

BRIEF DESCRIPTION OF THE DRAWINGS

The above and other features and advantages will become more apparent by describing in detail exemplary embodiments with reference to the attached drawings in which:

FIG. 4 is a block diagram of an image processor shown in FIG. 3.

DETAILED DESCRIPTION

Figure 1:
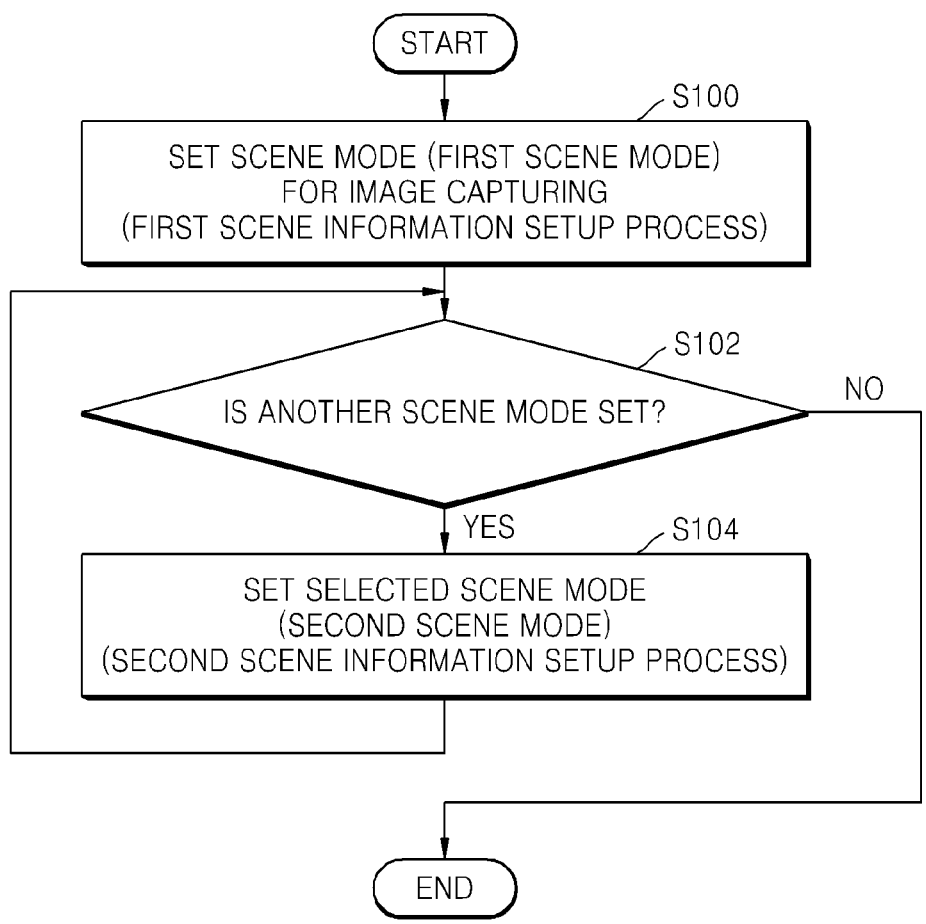
FIG. 1 is a flowchart of a scene information setup process in a photographing apparatus, according to an exemplary embodiment.

Embodiments may allow various kinds of change or modification and various changes in form, and specific embodiments will be illustrated in drawings and described in detail in the specification. However, it should be understood that the specific embodiments do not limit the present invention to a specific disclosing form but include every modified, equivalent, or replaced one within the spirit and technical scope of the present invention. In the following description, well-known functions or constructions are not described in detail since they would obscure the invention with unnecessary detail.

Although terms, such as 'first' and 'second', can be used to describe various elements, the elements cannot be limited by the terms. The terms can be used to classify a certain element from another element.

The terminology used in the application is used only to describe specific embodiments and does not have any intention to limit the inventive concept. An expression in the singular includes an expression in the plural unless they are clearly different from each other in a context. In the application, it should be understood that terms, such as 'include' and 'have', are used to indicate the existence of implemented feature, number, step, operation, element, part, or a combination of them without excluding in advance the possibility of existence or addition of one or more other features, numbers, steps, operations, elements, parts, or combinations of them.

Hereinafter, embodiments will be described in detail by explaining preferred embodiments with reference to the attached drawings. Like or corresponding reference numerals in the drawings denote like elements, and thus their description will be omitted.

Conventional technologies for generating image data according to a scene mode cannot generate image data according to several scene modes that can reduce a data size and a processing time. However, a photographing apparatus (denoted as reference numeral 100 in FIG. 3, and hereinafter, indicated as a photographing apparatus 100) according to an embodiment can generate difference data based on a difference between a raw image, i.e., an image before image processing, and a feature image containing a feature part corresponding to a scene mode. The feature image may be extracted from the raw image. For example, when a scene mode regarding extraction of a feature image is "portrait" indicating image processing suitable for when the subject is a person, the photographing apparatus 100 can extract an image of a facial part of the subject in a raw image as the feature image. Thus, the photographing apparatus 100 can reduce a data size of difference data since the photographing apparatus 100 does not deal with a difference for the entire image as difference data.

Scene modes according to an exemplary embodiment may indicate image processing performed by the photographing apparatus 100 as being abstract. It may not be possible for a user using the photographing apparatus 100 to understand image processing contents even if the image processing contents are shown. Thus, the photographing apparatus 100 may, for example, guide the user to select a scene mode by showing scene modes indicating image processing as being abstract. The scene modes according to an exemplary embodiment can include, for example, "portrait" as described above, "landscape" indicating image processing suitable for when the subject is a landscape, "child" indicating image processing suitable for when the subject is a child, and "auto" indicating image processing suitable for general use regardless of the subject. In addition, the photographing apparatus 100 may further set several scene modes according to a subject or a photographing environment, for example, "snow", "beach", "macro", "sunset", "dawn", "backlight", "fireworks", and the like.

The photographing apparatus 100 can process the raw image acquired by photographing by using first scene information, which defines processing of the raw image, corresponding to a scene mode (hereinafter, a first scene mode) set for image capturing. In addition, the photographing apparatus 100 can process the feature image by using a second scene information, which defines processing of a feature image, corresponding to another scene mode (hereinafter, a second scene mode) set besides the first scene mode. For example, when the user sets several second scene modes, the photographing apparatus 100 can independently process several feature images respectively corresponding to the several second scene modes by using several pieces of second scene information respectively corresponding to the several second scene modes. Hereinafter, information defining processing of an image may be referred to as scene information.

The scene information according to an exemplary embodiment can include information indicating, for example, a type of image processing to be executed, parameters according to the type of image processing, and a feature part for extracting a feature image. Table 1 shows an example of information indicating the feature part for extracting the feature image according to an exemplary embodiment.

TABLE 1

| Scene mode | Contents of a feature part | Size |
| --- | --- | --- |
| Portrait | Skin color part | Small |
| Landscape | Correction processed part in the entire image | Large |
| Child | Skin color part | Small |

The photographing apparatus 100 can irreversibly compress image data after image processing of the raw image according to the scene mode set for image capturing. Thus, the photographing apparatus 100 can make a data size of image data stored in a recording medium smaller than that of the prior art since the photographing apparatus 100 does not store raw image data itself in the recording medium (for example, a memory unit to be described later) unlike the prior art.

The photographing apparatus 100 can generate image data (hereinafter, referred to as 'restored image data') for which image processing according to the scene mode corresponding to the feature image used to generate the difference data is performed by adding the irreversibly compressed image data (hereinafter, referred to as 'compressed image data') to the difference data based on the difference between the raw image and the feature image. Here, since the difference data is data based on the difference between the raw image and the feature image, an image indicated by the restored image data obtained by adding the difference data to the compressed image data is identical to an image indicated by image data obtained by directly performing image processing of the raw image according to the scene mode corresponding to the feature image used to generate the difference data. Thus, when the photographing apparatus 100 is used, an image obtained by using difference data is identical to an image obtained by performing image processing without using the difference data as the same as the prior art is used.

Since the photographing apparatus 100 can generate restored image data based on compressed image data and difference data, the photographing apparatus 100 can generate the restored image data in a shorter time than the prior art in which image processing of raw image data is performed.

By doing the above-described processing, the photographing apparatus 100 can generate image data according to several scene modes that can reduce a data size and a processing time.

An operation of the photographing apparatus 100 will now be described in more detail. The photographing apparatus 100 can generate image data according to several scene modes that can reduce a data size and a processing time by performing, for example, a scene information setup process or process (1), a data generation process or process (2), and a restoring process or process (3).

Scene Information Setup Process

In the scene information setup process, the photographing apparatus 100 can set a first scene information corresponding to a first scene mode, which is a scene mode for image capturing, and a second scene information corresponding to a second scene mode, which is another scene mode. The photographing apparatus 100 may perform the scene information setup process or process (1) based on an operation signal according to a user's operation, which is generated by an operation unit included in the photographing apparatus 100. FIG. 1 is a flowchart of a scene information setup process in the photographing apparatus 100, according to an exemplary embodiment.

Referring to FIG. 1, in operation S100, the photographing apparatus 100 may set a scene mode (may be referred to as a first scene mode) for image capturing (may be referred to as a first scene information setup process). For example, scene information corresponding to a scene mode set by a user is selected from among several pieces of scene information stored or memorized in advance, and the selected scene information is set as the first scene information. When the first scene information is not set, the photographing apparatus 100 may newly set the scene information corresponding to the set scene mode as the first scene information, and when the first scene information is already set, the photographing apparatus 100 may update the first scene information with the scene information corresponding to the set scene mode.

Upon setting the first scene mode in operation S100, the photographing apparatus 100 may determine in operation S102 whether to set another scene mode. For example, if an operation signal based on a user's operation indicates a setup of another scene mode, the photographing apparatus 100 may determine to set another scene mode.

If the photographing apparatus 100 determines not to set another scene mode in operation S102, the photographing apparatus 100 may end the scene information setup process.

If the photographing apparatus 100 determines to set another scene mode in operation S102, the photographing apparatus 100 may set a scene mode (may be referred to as a second scene mode) selected by the user (may be referred to as a second scene information setup process) in operation S104. For example, scene information corresponding to a scene mode set by the user is selected from among several pieces of scene information stored or memorized in advance, and the selected scene information is set as the second scene information. The photographing apparatus 100 may newly set scene information corresponding to the set scene mode as the second scene information regardless of whether the second scene information is not set or already set. Further, the photographing apparatus 100 may delete pre-set second scene information based on a user's operation in operation S104 (corresponding to release of the second scene mode)

Upon setting the second scene mode in operation S104, the photographing apparatus 100 may proceed back to operation S102.

The photographing apparatus 100 may set the first scene information or may set the first scene information and the second scene information by performing the process shown in FIG. 1.

Data Generation Process

Figure 2:
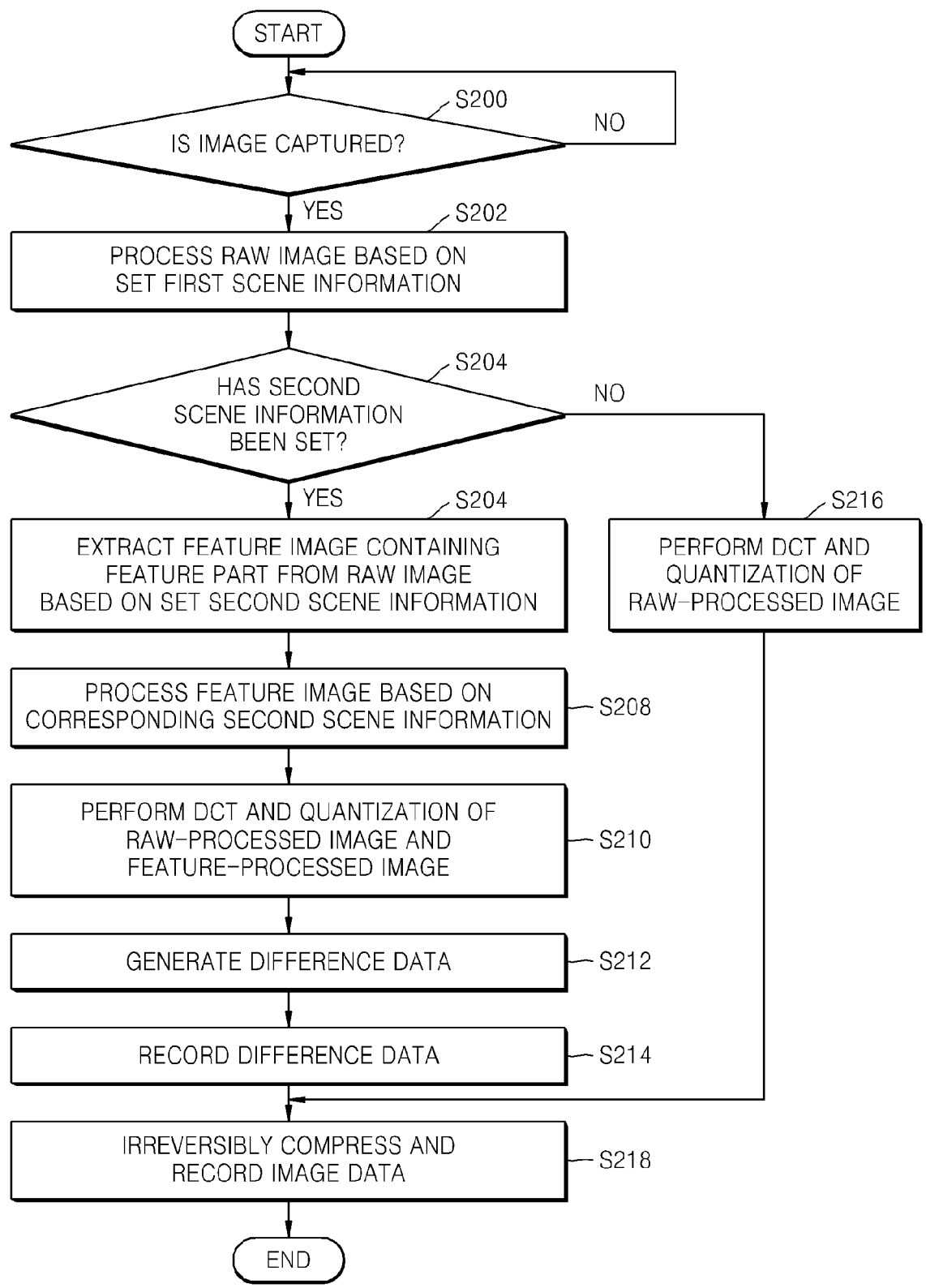
FIG. 2 is a flowchart of a data generation process in a photographing apparatus, according to an exemplary embodiment.

The photographing apparatus 100 may generate image data or image data and difference data in a case of image capturing. FIG. 2 is a flowchart of a data generation process in the photographing apparatus 100, according to another exemplary embodiment of the present invention.

Referring to FIG. 2, the photographing apparatus 100 may determine in operation S200 whether to capture an image. For example, the photographing apparatus 100 may determine to capture an image when detecting an operation signal based on push of a shutter button (an example of a user's operation). If the photographing apparatus 100 determines in operation S200 not to capture an image, the photographing apparatus 100 may not proceed to the next operation until the photographing apparatus 100 determines to capture an image.

If the photographing apparatus 100 determines in operation S200 to capture an image, in operation S202, the photographing apparatus 100 may generate a raw image by picking up an image in an image pickup unit (described later) and processing the raw image based on a set first scene information.

The photographing apparatus 100 may determine in operation S204 whether second scene information is set. Although the photographing apparatus 100 performs operation S204 after performing operation S202 in FIG. 2, the photographing apparatus 100 may independently perform operation S202 and operation S204. That is, the photographing apparatus 100 may synchronously perform operation S202 and operation S204.

If the photographing apparatus 100 determines in operation S204 that the second scene information is not set, the photographing apparatus 100 may perform discrete cosine transform (DCT) and quantization of the raw image processed based on the first scene information (hereinafter, referred to as 'raw-processed image') in operation S216. Thereafter, the photographing apparatus 100 may proceed to operation S218.

If the photographing apparatus 100 determines in operation S204 that the second scene information is set, the photographing apparatus 100 may extract a feature image containing a feature part corresponding to the second scene information from the raw image based on the second scene information. In addition, the photographing apparatus 100 may add meta information indicating a position in the raw image to the extracted feature image.

The photographing apparatus 100 may extract the feature image in a Minimum Coded Unit (MCU) of irreversible compression in operation S218 described later. Accordingly, the photographing apparatus 100 can simplify generation of restored image data by using image data (compressed image data) irreversibly compressed in operation S218 (described later) and difference data generated in operation S212 described later. Further, when the feature image is extracted in an MCU of irreversible compression, the photographing apparatus 100 may perform operations described later by considering, for example, several feature images within a predetermined range as a single feature image group.

In addition, the photographing apparatus 100 may perform operation S206 for every set second scene information. That is, for example, when several pieces of second scene information are set in the scene information setup process shown in FIG. 1, feature images according to the set several pieces of second scene information are extracted.

Upon extracting the feature image(s) in operation S206, the photographing apparatus 100 may process the feature image(s) based on the second scene information respectively corresponding to the feature image(s) in operation S208.

In operation S210, the photographing apparatus 100 may perform DCT and quantization of the raw-processed image processed in operation S202 and the feature image processed based on the second scene information in operation S208 (hereinafter, referred to as 'feature-processed image')

Upon performing DCT and quantization in operation S210, in operation S212, the photographing apparatus 100 may generate on a feature image data basis difference data indicating a difference between image data obtained by processing the raw-processed image in operation S210 and feature image data obtained by processing the feature-processed image in operation S210. Here, the photographing apparatus 100 may generate the difference data by, for example, subtracting the feature image data from the image data.

Upon generating the difference data in operation S212, the photographing apparatus 100 may record the generated difference data in operation S214. Here, the photographing apparatus 100 may record the generated difference data in a recording medium, such as a memory unit (described later) included in the photographing apparatus 100 or an external recording medium. Further, the photographing apparatus 100 may record, for example, the difference data in a recording area unique to a manufacturer of the photographing apparatus 100 or may record the difference data as another file different from the image data.

Further, the photographing apparatus 100 may record difference data compressed by performing irreversible compression of the difference data. By doing this, the photographing apparatus 100 can further reduce a data size of the difference data. The photographing apparatus 100 can compress the difference data by performing, for example, a Huffman encoding process.

Upon performing operation S214 or operation S216, the photographing apparatus 100 can irreversibly compress and record the image data in operation S218. Here, the photographing apparatus 100 may irreversibly compress the image data in, for example, a JPEG format or a JPEG 2000 format and record the compressed image data in a recording medium, such as the memory unit (described later) included in the photographing apparatus 100 or an external recording medium.

The photographing apparatus 100 may generate the compressed image data and the difference data based on the first scene information set in the scene information setup process shown in FIG. 1 or the first scene information and the second scene information set in the scene information setup process shown in FIG. 1 and record the compressed image data and the difference data in a recording medium by performing the process shown in FIG. 2.

Restoring Process

When the photographing apparatus 100 detects an image restoration command corresponding to the second scene mode based on a user's operation, the photographing apparatus 100 may generate restored image data according to the second scene mode, which corresponds to difference data, by adding the difference data corresponding to the second scene mode to the compressed image data generated in the process (2) (data generation process).

When the photographing apparatus 100 detects the image restoration command, the photographing apparatus 100 may read compressed image data and difference data corresponding to the image restoration command from a recording medium. If the difference data is compressed according to the Huffman encoding process, the photographing apparatus 100 may restore the difference data by performing a Huffman decoding process. Thereafter, the photographing apparatus 100 can generate restored image data by adding the difference data to an MCU of the compressed image data corresponding to the difference data. Further, the photographing apparatus 100 may generate a JPEG image (an example of an image indicated by the restored image data) by performing Huffman coding of the restored image data.

The photographing apparatus 100 can perform, for example, the scene information setup process, the data generation process, and the restoring process or processes (1) to (3). The photographing apparatus 100 can set first scene information and second scene information by the scene information setup process or process (1). The photographing apparatus 100 can generate difference data based on a difference between a raw image and a feature image by extracting the feature image corresponding to the second scene mode from the raw image in the data generation process or process (2). The photographing apparatus 100 can irreversibly compress image data obtained by performing image processing of the raw image according to the first scene mode in the data generation process or process (2). The photographing apparatus 100 can generate restored image data by adding the difference data to the compressed image data in the restoring process or process (3).

Thus, the photographing apparatus 100 can show the effects indicated in the processing outline of the photographing apparatus 100 described above by, for example, performing the scene information setup process, the data generation process, and the restoring process or processes (1) to (3).

Figure 3:
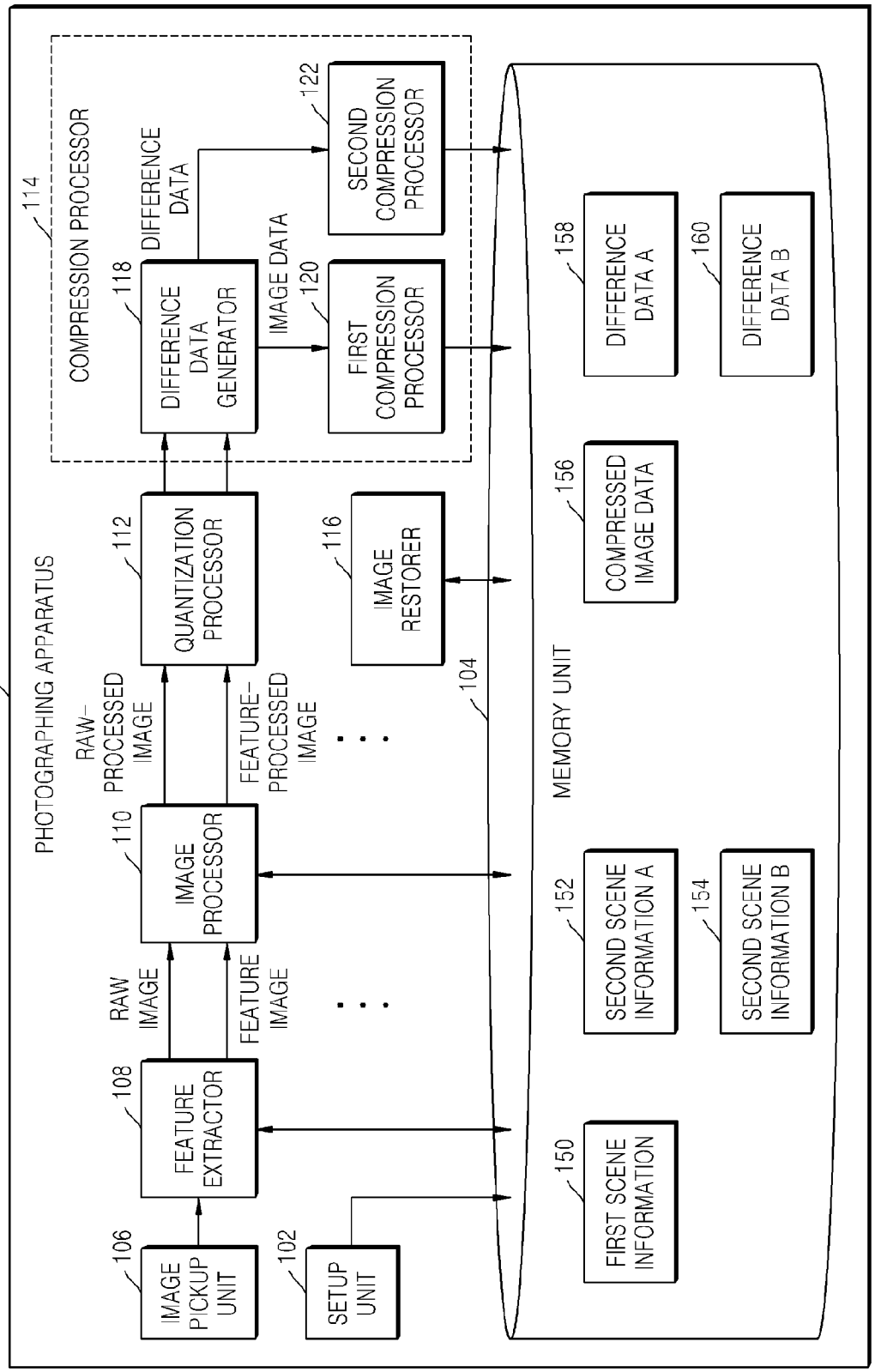
FIG. 3 is a block diagram of a photographing apparatus according to an exemplary embodiment.

An example of a configuration of the photographing apparatus 100 for performing the scene information setup process, the data generation process, and the restoring process or processes (1) to (3) will now be described. FIG. 3 is a block diagram of the photographing apparatus 100 according to an exemplary embodiment. Referring to FIG. 3, the photographing apparatus 100 can include a setup unit 102, a memory unit 104, an image pickup unit 106, a feature extractor 108, an image processor 110, a quantization processor 112, a compression processor 114, and an image restorer 116.

The photographing apparatus 100 may further include a controller (not shown) for generally controlling the photographing apparatus 100 with a Central Processing Unit (CPU) and various kinds of processing circuits, a Read Only Memory (ROM, not shown) for recording program used by the controller and control data, such as computation parameters, a Random Access Memory (RAM, not shown) for primarily storing or memorizing program executed by the controller, an operation unit (not shown), which can be operated by a user, a display unit (not shown), and a communication unit (not shown) for communicating with an external device.

Examples of the operation unit can be an operation input device, such as a keyboard and a mouse, a button, a direction key, or a combination thereof. Further, the operation unit may have, for example, a function of receiving an input from an external device, such as a remote control. The display unit may be a display means equipped in the photographing apparatus 100 and may display several display screens. Examples of screens displayed on the display unit can be a screen on which an image (a moving picture or a still image) indicated by image data stored or memorized in the memory unit 104 is displayed and a screen on which an image (a moving picture or a still image) indicated by restored image data restored according to the restoring process or process (3) is displayed. The display unit may include, for example, a Liquid Crystal Display (LCD) or an organic Electroluminescent (EL) display. The communication unit may be a communication means equipped in the photographing apparatus 100 and cab perform wired/wireless communication with an external device through a network (or directly). The communication unit may include, for example, a Local Area Network (LAN) terminal and a transmitter circuit or an Institute of Electrical and Electronics Engineers (IEEE) 802.15.1 port and a transmitter circuit.

The setup unit 102 can take the lead in the scene information setup process or process (1). The setup unit 102, for example, may perform the process shown in FIG. 1 based on an operation signal according to a user's operation, which is transmitted from the operation unit, and sets first scene information or the first scene information and second scene information in the memory unit 104. Alternatively, the controller may perform the function of the setup unit 102 in the photographing apparatus 100.

The memory unit 104 can be a memory means equipped in the photographing apparatus 100. The memory unit 104 may include, for example, a magnetic recording medium, such as a hard disk, or a nonvolatile memory, such as a flash memory. The memory unit 104 can store or memorize various kinds of data, such as scene information, compressed image data, difference data corresponding to the compressed image data, and applications. In FIG. 3, the memory unit 104 can store or memorize first scene information 150, second scene information A 152, second scene information B 154, compressed image data 156 corresponding to the first scene information 150, difference data A 158 corresponding to the second scene information A 152, and difference data B 160 corresponding to the second scene information B 154.

The image pickup unit 106 can include a shutter and an image pickup device, such as a Charge Coupled Device (CCD), and can capture an image based on an operation signal according to a user's operation, which is transmitted from the operation unit. The image pickup unit 106 can output a raw image obtained as a result of the image capturing to the feature extractor 108.

The feature extractor 108, the image processor 110, the quantization processor 112, and the compression processor 114 can perform the data generation process or process (2). Although the photographing apparatus 100 includes the feature extractor 108, the image processor 110, the quantization processor 112, and the compression processor 114 as processing circuits for performing respective processes in FIG. 3, the photographing apparatus 100 may include the processing circuits or other circuits that can perform the data generation process as an integrated circuit (i.e., a single processing circuit).

The feature extractor 108 can extract a feature image from the raw image based on the second scene information stored or memorized in the memory unit 104. The feature extractor 108 can output the raw image and the feature image to the image processor 110. If the second scene information is not stored or memorized in the memory unit 104 (i.e., if the second scene information is not set), the feature extractor 108 may not extract a feature image. In addition, if the photographing apparatus 100 has a configuration in which the image pickup unit 106 directly outputs the raw image to the image processor 110, the feature extractor 108 can output the feature image to the image processor 110.

The image processor 110 can output processed images (raw-processed image and feature-processed image) by sequentially or selectively performing different processing for the input images (the raw image and one or two or more feature images). The image processor 110 can perform image processing according to the first scene information for the raw image based on the first scene information. In addition, when the feature image is inputted, the image processor 110 may perform image processing according to the second scene information for the feature image based on the second scene information corresponding to the feature image, which is stored or memorized in the memory unit 104.

FIG. 4 is a block diagram of the image processor 110 shown in FIG. 3. Referring to FIG. 4, the image processor 110 can include a noise reduction processor 130, a white balance processor 132, a color interpolation processor 134, a gamma processor 136, a color processor 138, and a contour emphasis processor 140 as processors. The image processor 110 can also include a processing management unit 142 that selectively controls one or more processors 130, 132, 134, 136, 138, or 140 to perform its corresponding processing.

The noise reduction processor 130 can reduce noise included in an image by performing filter processing using a filter, such as a low-pass filter or a band-pass filter. The white balance processor 132 can amplify a pixel value of each pixel by, for example, multiplying each color of RGB (Red, Green, and Blue) by a pre-set gain for an image. The color interpolation processor 134 can generate RGB of every pixel from, for example, a Bayer array. The gamma processor 136 can secure visual linearity by, for example, nonlinear transforming an image. The color processor 138 can compensate for, for example, a color tone of an image. The contour emphasis processor 140 can emphasize light and shade of an image by detecting an edge part from the image and increasing brightness of the detected edge part.

The processing management unit 142 can selectively control one or more processors to perform its corresponding processing based on the first scene information when an input image is the raw image. By the processing management unit 142 selectively controlling each processor to perform processing based on the first scene information for the input raw image, the raw-processed image output from the image processor 110 can become an image for which image processing according to the first scene mode set for the raw image has been performed.

The processing management unit 142 can selectively control each processor to perform corresponding processing based on the second scene information corresponding to the feature image when an input image is the feature image. By the processing management unit 142 selectively controlling each processor to perform its corresponding processing based on the second scene information corresponding to the input feature image, the feature-processed image output from the image processor 110 can become an image for which image processing according to the second scene mode set for the feature image has been performed. Table 2 illustrates extraction contents of a feature image when each processor performs corresponding processing for the feature image. In Table 2, NR denotes noise reduction, and WB denotes white balance.

TABLE 2

| Processing contents | Extraction contents of feature image | Size |
|---|---|---|
| NR processing | Noise-reduced part from among the entire image | Large |
| WB processing | WB corrected part from among the entire image | Large |
| Gamma processing | Gamma corrected part from among the entire image | Large |
| Color processing | The entire image | Medium, large |
| Contour emphasis processing | Edge part from among the entire image | Medium |

The image processor 110 can output the processed images by sequentially or selectively different processing for an input image with, for example, the configuration illustrated in FIG. 4. The photographing apparatus 100 may include the configuration of the processors illustrated in FIG. 4 with a corresponding number of input images (raw image and feature image).

Referring back to FIG. 3, the quantization processor 112 can perform DCT and quantization of each of the processed images.

The compression processor 114 can record compressed image data and difference data in the memory unit 104 by performing generation of the difference data and compression of image data. The compression processor 114 may compress the generated difference data.

The compression processor 114 can include a difference data generator 118, a first compression processor (image compressor) 120, and a second compression processor 122. Although the compression processor 114 includes the second compression processor 122 for compressing the difference data in FIG. 3, the compression processor 114 may not include the second compression processor 122.

The difference data generator 118 can generate difference data on a feature image data basis based on image data obtained by processing the raw-processed image and feature image data obtained by processing the feature-processed image, which are outputted from the quantization processor 112. The difference data generator 118 can output the image data to the first compression processor 120 and the generated one, two, or more pieces of difference data to the second compression processor 122. Although not shown in FIG. 3, the difference data generator 118 may include a volatile memory, such as a Synchronous Dynamic Random Access Memory (SDRAM), and may generate difference data after memorizing image data and one, two, or more pieces of feature image data output from the quantization processor 112.

The first compression processor 120 can irreversibly compress the input image data and can record the irreversibly compressed image data in the memory unit 104. The second compression processor 122 can record compressed difference data obtained by performing Huffman compression (an example of reversible compression) of each of the input difference data.

The photographing apparatus 100 can perform the data generation process or process (2) by including the feature extractor 108, the image processor 110, the quantization processor 112, and the compression processor 114.

The image restorer 116 can perform the restoring process or process (3). When the image restorer 116 detects a restoration command based on an operation signal according to a user's operation, which is transmitted from the operation unit, the image restorer 116 can read compressed image data and difference data corresponding to the restoration command from the memory unit 104. The image restorer 116 can restore difference data by performing a Huffman decoding process and can generate restored image data by adding the difference data to an MCU of image data corresponding to the difference data. The image restorer 116 can generate a JPEG image (an example of an image indicated by the restored image data) by performing a Huffman coding process for the restored image data. The image restorer 116 may display an image indicated by the restored image data on the display unit and may record the restored image data in the memory unit 104.

The image restorer 116 can also display an image indicated by the restored image data stored or memorized in the memory unit 104 on the display unit based on an operation signal according to a user's operation, which is transmitted from the operation unit.

With the image restorer 116, the photographing apparatus 100 can provide an image indicated by compressed image data corresponding to the first scene mode and an image corresponding to the second scene mode to the user. The photographing apparatus 100 may further include a display controller for displaying an image indicated by compressed image data or an image indicated by restored image data generated by the image restorer 116 on the display unit. In addition, in the photographing apparatus 100, the controller may perform a function of the image restorer 116.

The photographing apparatus 100 may perform the restoring process or process (3) by executing in the controller a program for a computer to act as an image restoring means corresponding to the image restorer 116.

The photographing apparatus 100 can perform the scene information setup process, data generation process, and the restoring process or processes (1) to (3) by the configuration illustrated in FIG. 3. Thus, the photographing apparatus 100 can generate image data according to several scene modes that can reduce a data size and a processing time.

As described above, the photographing apparatus 100 according to an exemplary embodiment can generate difference data based on a difference between a raw image and a feature image by extracting the feature image corresponding to the second scene mode from the raw image (process (2) (data generation process)). Thus, since the photographing apparatus 100 does not use a difference according to the entire image as difference data, image processing of the difference data can be reduced, and a data size of the difference data can be reduced. In addition, since the photographing apparatus 100 does not need a developing process for feature part extraction, a processing time can be further reduced.

In addition, the photographing apparatus 100 can irreversibly compress image data obtained by performing image processing according to the first scene mode for a raw image (process of (2) (data generation process)). Here, difference data is data based on a difference between the raw image and a feature image. Thus, an image indicated by restored image data obtained by adding the difference data to compressed image data generated by the photographing apparatus 100 is identical to an image indicated by image data obtained by directly performing image processing of the raw image according to a scene mode corresponding to the feature image used to generate the difference data.

In addition, the photographing apparatus 100 can irreversibly compress image data obtained by performing image processing of a raw image according to the first scene mode set for image capturing. Thus, since the photographing apparatus 100 does not store or memorize raw image data itself in the memory unit 104, a data size of memorized image data can be reduced.

In addition, the photographing apparatus 100 can generate restored image data by adding difference data to compressed image data (restoring process or process (3)). Thus, since the photographing apparatus 100 does not have to perform an Inverse DCT (IDCT) process when the difference data is restored, the photographing apparatus 100 can generate the restored image data in a short time.

Accordingly, the photographing apparatus 100 can generate image data according to several scene modes that can reduce a data size and a processing time.

The photographing apparatus 100 may have a configuration in which a raw image transmitted from an external device acting as the image pickup unit 106 is processed without the image pickup unit 106. Even in this case, since a photographing apparatus or an image processing apparatus according to a modified embodiment can perform the scene information setup process, data generation process, and the restoring process or processes (1) to (3) described above, the photographing apparatus or the image processing apparatus according to a modified embodiment can obtain the same effect as the photographing apparatus 100.

Although the photographing apparatus 100 according to an exemplary embodiment has been described, the photographing apparatus 100 according to various embodiments can be applied to various devices, such as a photographing apparatus such as a digital still camera or a digital video camera, a portable communication apparatus such as a cellular phone, a computer such as a Personal Computer (PC) or a server, and a portable game machine.

With a program for executing the process (2) (data generation process), which is installed in a computer, as an example regarding a program according to an exemplary embodiment, image data according to several scene modes can be generated with aiming to reduce a data size and a processing time.

In addition, with a program (program for executing the process (3) (restoring process) in a computer) for acting as an image restoration means corresponding to the image restorer 116 of the photographing apparatus 100 according to an exemplary embodiment of the present invention, restored image data according to a scene mode corresponding to difference data can be generated based on compressed image data and the difference data according to an exemplary embodiment of the present invention.

While exemplary embodiments of the present invention have been described in detail with reference to accompanying drawings, the present invention is not limited to the embodiments. It will be understood by those of ordinary skill in the art that various changes or modifications in form and details may be made therein without departing from the technical spirit and scope of the present invention as defined by the following claims.

For example, although the program (computer program) for executing the process (2) (data generation process) and the program (computer program) for acting as an image restoration means corresponding to the image restorer 116 of the photographing apparatus 100 according to an exemplary embodiment of the present invention are provided to a computer, recording media according to an exemplary embodiment of the present invention for memorizing the programs can also be provided.

The above-described configuration is an illustration of an exemplary embodiment of the present invention, and it will be understood that the above-described configuration is within the technical scope of the present invention.

An apparatus according to the present invention may include a processor, a memory for storing and executing program data, a permanent storage such as a disk drive, a communication port for performing communication with an external device, and a user interface, such as a touch panel, a key, and a button. Methods implemented with a software module or an algorithm may be stored in a computer readable recording medium in the form of computer readable codes or program instructions executable in the processor. Examples of the computer readable recording medium include magnetic storage media (e.g., read-only memory (ROM), random-access memory (RAM), floppy disks, hard disks, etc.) and optical recording media (e.g., CD-ROMs, Digital Versatile Discs (DVDs), etc.). The computer readable recording medium can also be distributed over network coupled computer systems so that the computer readable code is stored and executed in a distributed fashion. The media can be read by a computer, stored in the memory, and executed by the processor.

All cited references including publicized documents, patent applications, and patents cited in the present invention can be merged in the present invention in the same manner as the shown by individually and concretely merging each cited reference and the shown by generally merging each cited reference in the present invention.

For the understanding of the present invention, reference numerals are disclosed in the exemplary embodiments shown in the drawings, and specific terms are used to describe the exemplary embodiments of the present invention. However, the present invention is not limited by the specific terms, and the present invention may include all components, which can be commonly thought by those of ordinary skill in the art. The present invention can be represented with functional blocks and various processing steps. These functional blocks can be implemented by various numbers of hardware and/or software configurations for executing specific functions. For example, the present invention may adopt direct circuit configurations, such as memory, processing, logic, and look-up table, for executing various functions under a control of one or more processors or by other control devices. Like that the components of the present invention can execute the various functions with software programming or software elements, the present invention can be implemented by a programming or scripting language, such as C, C++, Java, or assembler, with various algorithms implemented by a combination of a data structure, processes, routines, and/or other programming components. Functional aspects can be implemented with algorithms executed in one or more processors. In addition, the present invention may adopt the prior art for electronic environment setup, signal processing and/or data processing. The terms, such as "mechanism", "element", "means", and "configuration", can be widely used and are not delimited as mechanical and physical configurations. The terms may include the meaning of a series of routines of software in association with a processor.

Specific executions described in the present invention are exemplary embodiments and do not limit the scope of the present invention even in any method. For conciseness of the specification, disclosure of conventional electronic configurations, control systems, software, and other functional aspects of the systems may be omitted. In addition, connections or connection members of lines between components shown in the drawings illustrate functional connections and/or physical or circuit connections, and the connections or connection members can be represented by replaceable or additional various functional connections, physical connections, or circuit connections in an actual apparatus. In addition, if there is no concrete mention, such as "requisite" or "important", it may not be a necessarily required component for application of the present invention.

The use of the term "said" or a similar directional term in the specification (in particular, in claims) of the present invention may correspond to both the singular and the plural. In addition, when a range is disclosed in the present invention, inventions to which individual values belonging to the range are applied are included (if there is no disclosure opposed to this), and this is the same as that each of the individual values forming the range is disclosed in the detailed description of the present invention. Finally, for steps forming the methods according to the present invention, if an order is not clearly disclosed or, if there is no disclosure opposed to the clear order, the steps can be performed in a proper order. The present invention is not necessarily limited to the disclosed order of the steps. The use of all illustrations or illustrative terms (for example, and so forth, etc.) in the present invention is simply to describe the present invention in detail, and the scope of the present invention is not limited due to the illustrations or illustrative terms unless they are limited by claims. In addition, it will be understood by those of ordinary skill in the art that various modifications, combinations, and changes can be formed according to design conditions and factors within the scope of the attached claims or the equivalents.

What is claimed is:

1. A photographing apparatus comprising:
    an image pickup unit that generates a raw image by capturing a subject;
    a feature extractor that extracts a feature image containing at least one feature part from the raw image;
    an image processor that performs image processing of the raw image according to a first scene information, which defines processing for the raw image, and that performs image processing of the feature image according to a second scene information, which defines processing for the feature image;
    a quantizer that performs discrete cosine transform (DCT) and quantization of a raw-processed image obtained by performing image processing of the raw image and a feature-processed image obtained by performing image processing of the feature image;
    a difference data generator that generates difference data indicating a difference between image data obtained by processing the raw-processed image in the quantizer and feature image data obtained by processing the feature-processed image in the quantizer on a feature image data basis; and
    an image compressor that compresses the image data.

2. The photographing apparatus of claim 1, wherein the feature extractor extracts the feature image in a minimum coded unit (MCU) of compression in the image compressor.

3. The photographing apparatus of claim 2, further comprising an image restorer that generates another image data obtained by performing image processing of the raw image according to the second scene information corresponding to the feature image data used to generate the difference data by adding the difference data to a compressed image data obtained by compressing the image data.

4. The photographing apparatus of claim 1, wherein the image compressor performs irreversible compression of the image data.

5. The photographing apparatus of claim 1, wherein the image processor comprises:
    a plurality of processors, each of the plurality of processors selectively performing a different kind of processing for an input image; and
    a processing management unit that allows a first processor of the plurality of processors to perform processing according to the first scene information when the input image is the raw image and that allows a second processor of the plurality of processors to perform processing according to the second scene information when the input image is the feature image.

6. The photographing apparatus of claim 1, further comprising a setup unit that sets up at least one of the first scene information and the second scene information based on a user's operation.

7. A photographing method comprising:
    generating a raw image by capturing a subject;
    extracting a feature image containing at least one feature part from the raw image;
    performing image processing of the raw image according to a first scene information, which defines processing for the raw image, and performing image processing of the feature image according to a second scene information, which defines processing for the feature image;
    performing discrete cosine transform (DCT) and quantization of a raw-processed image obtained by performing image processing of the raw image and a feature-processed image obtained by performing image processing of the feature image;
    generating difference data indicating a difference between image data obtained by processing the raw-processed image in the performing of the DCT and quantization and feature image data obtained by processing the feature-processed image in the performing of the DCT and quantization on a feature image data basis; and
    compressing the image data.

8. The photographing method of claim 7, wherein the extracting of the feature image comprises extracting a plurality of feature images.

9. The photographing method of claim 8, further comprising:
    adding the difference data to compressed image data obtained by compressing the image data; and
    generating another image data obtained by performing image processing of the raw image according to the second scene information corresponding to the feature image data used to generate the difference data.

10. The photographing method of claim 7, wherein the compressing comprises performing irreversible compression of the image data.

11. The photographing method of claim 7, further comprising setting at least one of the first scene information and the second scene information based on a user's operation.

12. A non-transitory recording medium having recorded thereon a computer readable program comprising portions of code, which, when executed by a computer, cause the computer to execute the photographing method of claim 7.

* * * * *